US012512621B2

(12) United States Patent
Tanimura

(10) Patent No.: US 12,512,621 B2
(45) Date of Patent: Dec. 30, 2025

(54) LEVER-TYPE CONNECTOR

(71) Applicant: SUMITOMO WIRING SYSTEMS, LTD., Mie (JP)

(72) Inventor: Shunsuke Tanimura, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 291 days.

(21) Appl. No.: 18/282,489

(22) PCT Filed: Mar. 8, 2022

(86) PCT No.: PCT/JP2022/009947
§ 371 (c)(1),
(2) Date: Sep. 15, 2023

(87) PCT Pub. No.: WO2022/202288
PCT Pub. Date: Sep. 29, 2022

(65) Prior Publication Data

US 2024/0145992 A1 May 2, 2024

(30) Foreign Application Priority Data

Mar. 24, 2021 (JP) ................................ 2021-049778

(51) Int. Cl.
*H01R 13/629* (2006.01)
*H01R 13/52* (2006.01)

(52) U.S. Cl.
CPC ... *H01R 13/62933* (2013.01); *H01R 13/5205* (2013.01)

(58) Field of Classification Search
CPC ............ H01R 13/6293; H01R 13/5205; H01R 13/5208

(Continued)

(56) References Cited

U.S. PATENT DOCUMENTS

2011/0237109 A1 9/2011 Komiyama
2012/0208383 A1 8/2012 Kobayashi et al.
(Continued)

FOREIGN PATENT DOCUMENTS

DE 102014007101 A1 * 11/2014 ....... H01R 13/62955
JP H10-074563 A 3/1998
(Continued)

OTHER PUBLICATIONS

Machine Translation of DE102014007101 (Year: 2014).*
International Search Report issued on Apr. 26, 2022 for WO 2022/202288 A1 (4 pages).

*Primary Examiner* — Tulsidas C Patel
*Assistant Examiner* — Jeffrey Mountain
(74) *Attorney, Agent, or Firm* — Venjuris, P.C.

(57) ABSTRACT

A lever-type connector 10 including; a connector housing 11; a sealing member 60 configured to be abutted against a rear surface of a terminal housing part 12; a wire cover 40 that covers a wire W; and a lever 50, wherein the wire cover 40 includes outer covering parts 43 that cover the connector housing 11 from the outside, the lever 50 includes leg parts 51 that overlap outer sides of the corresponding outer covering parts 43 when the lever 50 is at a fitting completion position, protrusions 55 protruding toward the corresponding outer covering parts 43, and each having an inclined pressing surface 57 are provided on inner surfaces of the corresponding leg parts 51, and inclined pressed surfaces 48 against which the corresponding inclined pressing surfaces 57 are abutted are provided on outer surfaces of the corresponding outer covering parts 43.

4 Claims, 18 Drawing Sheets

(58) Field of Classification Search
USPC .......................................................... 439/345
See application file for complete search history.

(56) References Cited

U.S. PATENT DOCUMENTS

| | | | | |
|---|---|---|---|---|
| 2015/0056846 | A1* | 2/2015 | Kataoka ............... | H01R 13/506 439/456 |
| 2015/0171547 | A1* | 6/2015 | Toyoda ................ | H01R 13/567 439/460 |
| 2016/0315416 | A1* | 10/2016 | Kataoka ............... | H01R 13/502 |
| 2017/0373433 | A1* | 12/2017 | Matsumoto ...... | H01R 13/62938 |

FOREIGN PATENT DOCUMENTS

| | | | |
|---|---|---|---|
| JP | 2001-338718 | A | 12/2001 |
| JP | 2004-273344 | A | 9/2004 |
| JP | 2004-288500 | A | 10/2004 |
| JP | 2008-027787 | A | 2/2008 |
| JP | 2013-246914 | A | 12/2013 |

* cited by examiner

LEVER-TYPE CONNECTOR

CROSS REFERENCE TO RELATED APPLICATIONS

This application is a national phase of PCT application No. PCT/JP2022/009947, filed on 8 Mar. 2022, which claims priority from Japanese patent application No. 2021-049778, filed on 24 Mar. 2021, all of which are incorporated herein by reference.

TECHNICAL FIELD

A technique disclosed by the present specification relates to a lever-type connector.

BACKGROUND

As a conventional lever-type connector, the lever-type connector described in JP 2011-146249 A (Patent Document 1) is known. The lever-type connector includes a connector housing that houses terminals connected to end portions of wires, a cover that is attached to a wire lead-out side of the connector housing so as to lead the wires to the outside, and a lever that is pivotably mounted to the connector housing, and configured to pivot while a counterpart connector is semi-fitted to the connector housing, thereby moving the counterpart connector from a semi-fitted position to a normal fitted position.

In addition, as described in JP 2004-288500 A (Patent Document 2 listed below), a waterproof lever-type connector including a connector housing, a rear holder mounted to the connector housing, and a sealing member disposed therebetween is also known.

PRIOR ART DOCUMENT

Patent Document

Patent Document 1: JP 2011-146249 A
Patent Document 2: JP 2004-288500 A

SUMMARY OF THE INVENTION

Problems to be Solved

For a lever-type connector including a sealing member, a plurality of wires are passed through the sealing member, and therefore the outer diameter of the sealing member may bulge, which may cause deformation of the connector housing in the bulging direction. There is concern that the connector housing deformed in this manner may be subjected to plastic deformation if the bulging continues, thus resulting in a reduction in the waterproofness.

Means to Solve the Problem

The technique disclosed by the present specification relates to a lever-type connector including: a connector housing configured to be fittable to a counterpart connector, and including a terminal housing part that houses a terminal; a plate-shaped sealing member configured to be abutted against a rear surface of the terminal housing part inside the connector housing, and to allow a wire connected to the terminal to pass therethrough; a wire cover configured to be mounted to the connector housing, and to cover the wire that is pulled out from the connector housing; and a lever configured to be mounted to the connector housing, and to be pivotable from a fitting start position to a fitting completion position, wherein the wire cover includes outer covering parts that cover, from the outside, the connector housing at least at a part of a portion of the connector housing in which the sealing member is housed, the lever includes two leg parts, and an operation part that connects the two leg parts, and the leg parts are configured to overlap outer sides of the corresponding outer covering parts in a state in which at least the lever is disposed at the fitting completion position, protrusions protruding toward the corresponding outer covering parts are provided on inner surfaces of the corresponding leg parts at portions that overlap the corresponding outer covering parts in a state in which the lever is disposed at the fitting completion position, and the protrusions each include an inclined pressing surface that is inclined in a pivot progression direction in which the lever pivots from the fitting start position toward the fitting completion position, and inclined pressed surfaces that are inclined toward an opposite side in the pivot progression direction, and against which the corresponding inclined pressing surfaces are abutted are provided on outer surfaces of the corresponding outer covering parts at portions where the inclined pressing surfaces are disposed in a state in which the lever is disposed at the fitting completion position.

Effect of the Invention

With the lever-type connector disclosed by the present specification, it is possible to prevent bulging of the connector housing caused by the sealing member, thus suppressing a reduction in waterproofness.

DETAILED DESCRIPTION TO EXECUTE THE INVENTION

Figure 1:
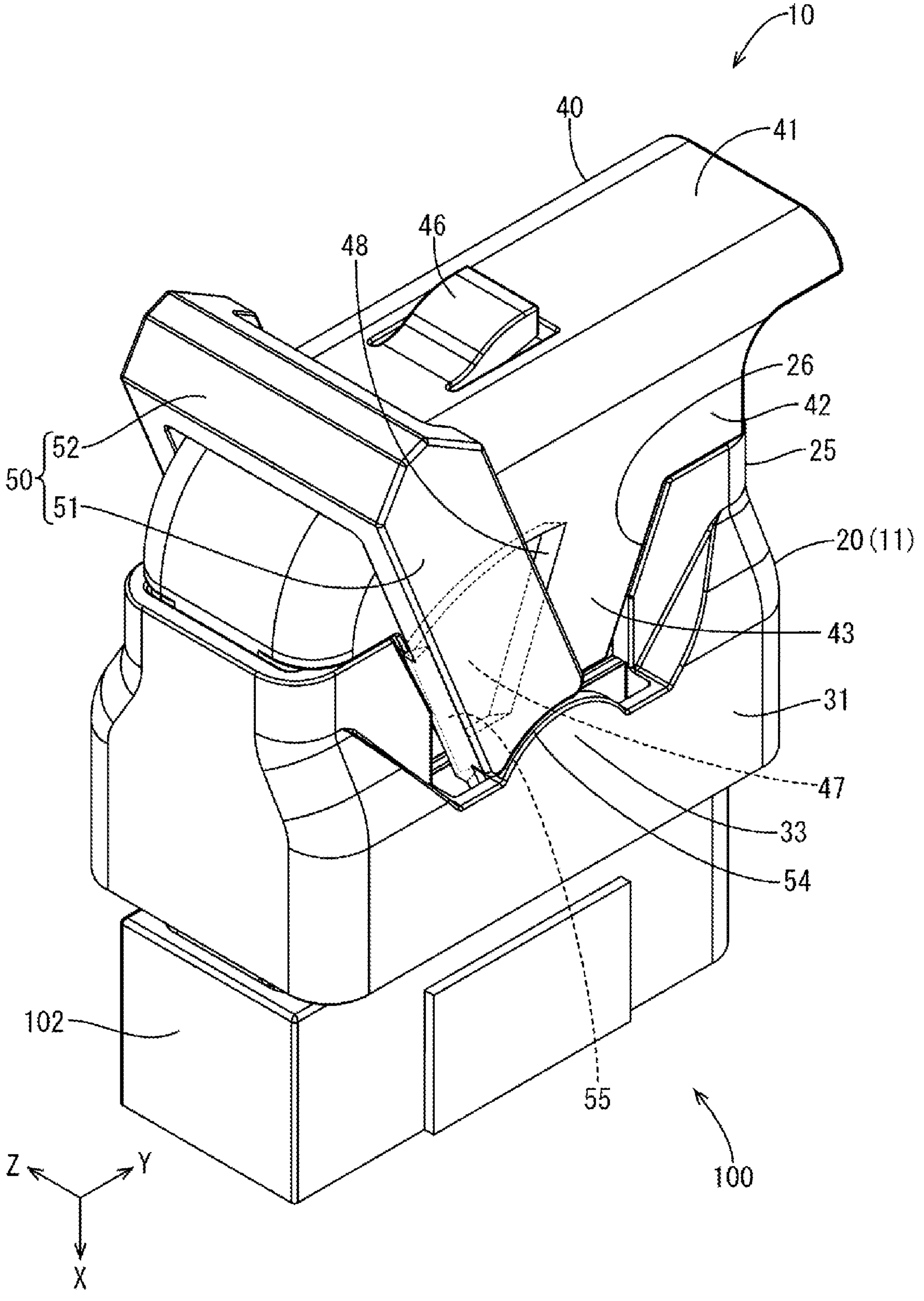
FIG. 1 is a perspective view showing a state in which a lever of a female connector according to an embodiment is disposed at a fitting start position.

Outline of Embodiments (1) A technique disclosed by the present specification relates to relates to a lever-type connector including: a connector housing configured to be fittable to a counterpart connector, and including a terminal housing part that houses a terminal; a plate-shaped sealing member configured to be abutted against a rear surface of the terminal housing part inside the connector housing, and to allow a wire connected to the terminal to pass therethrough; a wire cover configured to be mounted to the connector housing, and to cover the wire that is pulled out from the connector housing; and a lever configured to be mounted to the connector housing, and to be pivotable from a fitting start position to a fitting completion position, wherein the wire cover includes outer covering parts that cover, from the outside, the connector housing at least at a part of a portion of the connector housing in which the sealing member is housed, the lever includes two leg parts, and an operation part that connects the two leg parts, and the leg parts are configured to overlap outer sides of the corresponding outer covering parts in a state in which at least the lever is disposed at the fitting completion position, protrusions protruding toward the corresponding outer covering parts are provided on inner surfaces of the corresponding leg parts at portions that overlap the corresponding outer covering parts in a state in which the lever is disposed at the fitting completion position, and the protrusions each include an inclined pressing surface that is inclined in a pivot progression direction in which the lever pivots from the fitting start position toward the fitting completion position, and inclined pressed surfaces that are inclined toward an opposite side in the pivot progression direction, and against which the corresponding inclined pressing surfaces are abutted are provided on outer surfaces of the corresponding outer covering parts at portions where the inclined pressing surfaces are disposed in a state in which the lever is disposed at the fitting completion position.

With the aforementioned configuration, even if the sealing member through which the wire is passed bulges outward in the radial direction in a state in which the lever is disposed at the fitting completion position, and a force is exerted in a direction (outward) to cause the connector housing to bulge, the connector housing is pressed inward by the outer covering parts of the wire cover and the leg parts of the lever that overlap the outer surface of the connector housing, whereby bulging of the connector housing is suppressed.

Moreover, the protrusions provided on the leg parts of the lever reliably press the connector housing via the outer covering parts with a partially strong force. Accordingly, it is possible to more reliably suppress deformation (bulging) of the connector housing as compared with a configuration in which the lever includes no protrusions.

In addition, the inclined pressing surfaces provided on the protrusions of the lever are abutted against the corresponding inclined pressed surfaces provided on the wire cover upon completion of fitting. Accordingly, the provision of the protrusions does not significantly increase the fitting force required during pivoting as compared with a configuration in which no protrusions are provided. On the other hand, in a state in which the lever is disposed at the fitting completion position, the inclined pressing surfaces and the inclined pressed surfaces have already abutted against each other. Accordingly, even if a force is exerted on the connector housing in a bulging direction, deformation of the connector housing is suppressed, and the connector housing is pressed inward with a partially strong force.

Moreover, the inclined pressing surfaces and the corresponding inclined pressed surfaces can overlap each other by moving over each other until a clearance formed between the lever and the wire cover is filled. Accordingly, it is possible to more reliably suppress deformation of the connector housing.

(2) A pivot allowing part for allowing pivoting of each of the protrusions may be formed on the corresponding outer covering part by cutting out a portion of an outer surface side of the outer covering part, along a pivot trajectory along which the protrusion pivots when the lever pivots between the fitting start position and the fitting completion position, and each of the inclined pressed surfaces may be constituted by a cut-out edge portion formed by cutting out a portion of the corresponding pivot allowing part.

With the aforementioned configuration, it is possible to realize an embodiment of a configuration in which the lever does not interfere with the wire cover when being pivoted from the fitting start position to the fitting completion position, and the inclined pressing surfaces of the protrusions abut against the corresponding inclined pressed surfaces of the wire cover at the time when the lever is disposed at the fitting completion position. Accordingly, it is possible to prevent a frictional force generated as a result of the lever coming into slidable contact with the wire cover while pivoting from being added to the fitting force.

(3) The inclined pressed surfaces may be provided at a central portion of the wire cover in a length direction of the connector housing.

With the aforementioned configuration, it is possible to more effectively suppress deformation of the connector housing.

(4) The lever-type connector may further include a lock part that restricts pivoting of the lever toward the fitting start position in a state in which the lever is disposed at the fitting completion position.

With the aforementioned configuration, it is possible to avoid a situation where bulging of the connector housing causes the lever to be pressed back toward the fitting start position, thus enabling the connector housing to be continuously pressed inward in a reliable manner.

Details of Embodiments

Specific examples of the technique disclosed by the present specification will be described below with reference to the drawings. It should be noted that the technique disclosed by the present specification is not limited to these examples, but is defined by the claims, and is intended to include all modifications which fall within the scope of the claims and the meaning and scope of equivalents thereof.

Embodiments

An embodiment will be described with reference to FIGS. 1 to 18. In the following description, the X direction shown in the drawings is the forward direction, and the direction opposite thereto is the rearward direction. In addition, the Y direction is the rightward direction, and the direction opposite thereto is the leftward direction. Furthermore, the description will be given taking a direction extending along the Y direction as the length direction, and a direction extending along the Z direction as the width direction. For the sake of convenience, a female terminal and a wire may not be shown.

A lever-type connector according to the present embodiment is a female connector 10 configured to be fitted to a male connector 100 (an exemplary counterpart connector). The female connector 10 includes a housing (an exemplary connector housing) 11 that holds a female terminal 70 to which an end of a wire W is connected, a wire cover 40 configured to be mounted to the housing 11, and a lever 50 also configured to be mounted to the housing 11.

Housing 11

Figure 3:
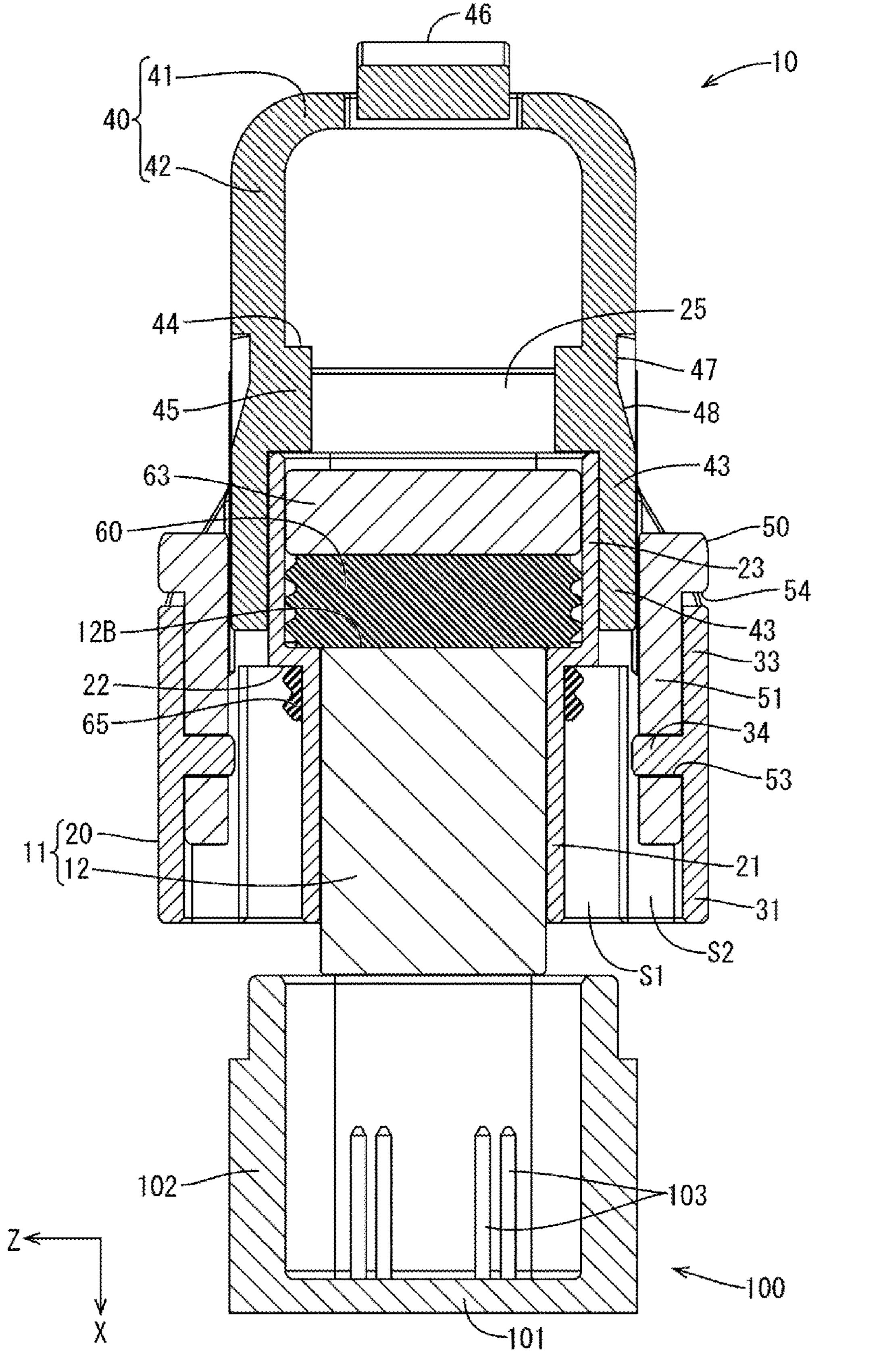
FIG. 3 is a cross-sectional view taken along the line A-A in FIG. 2.
Figure 4:
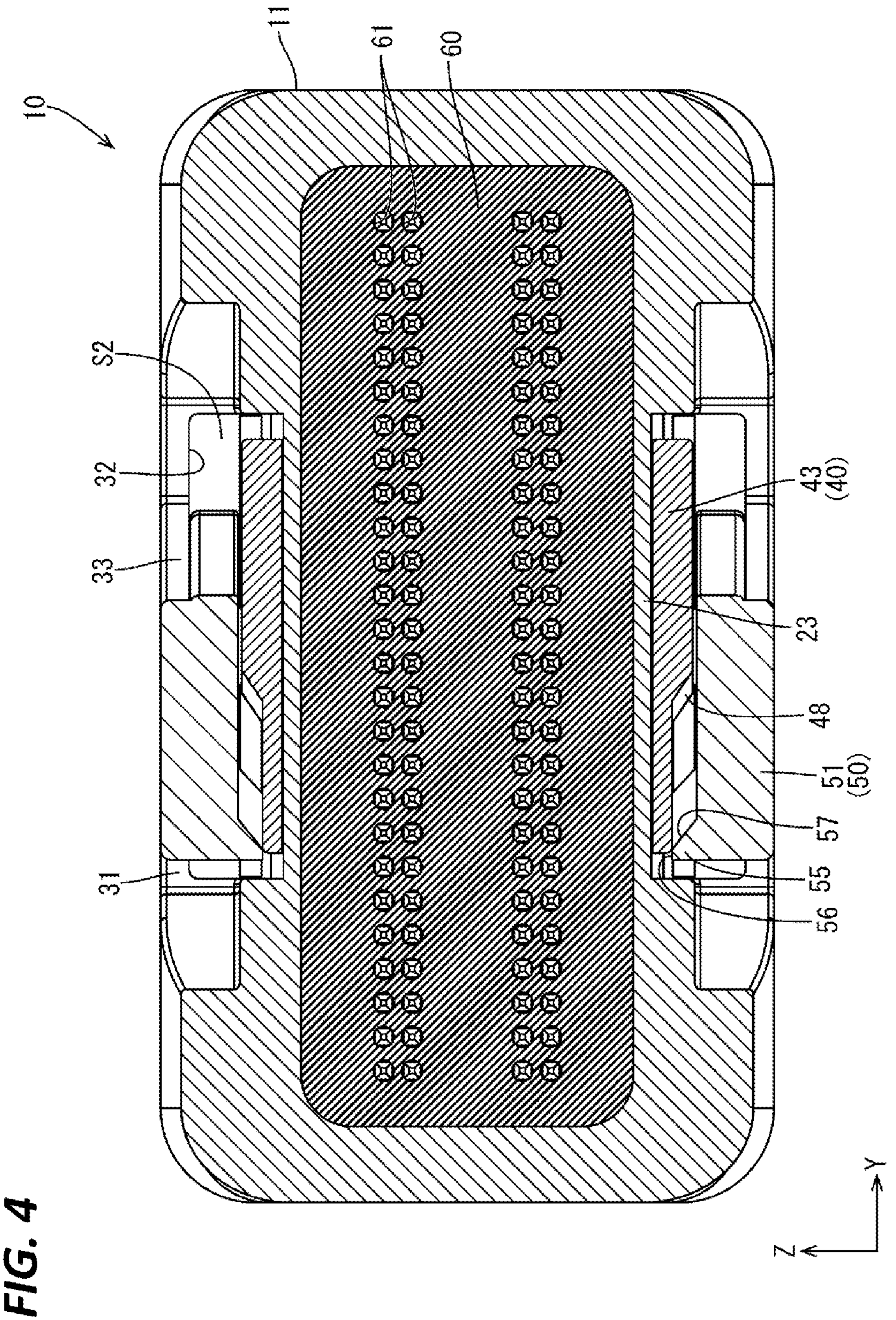
FIG. 4 is a cross-sectional view taken along the line B-B in FIG. 2.
Figure 5:
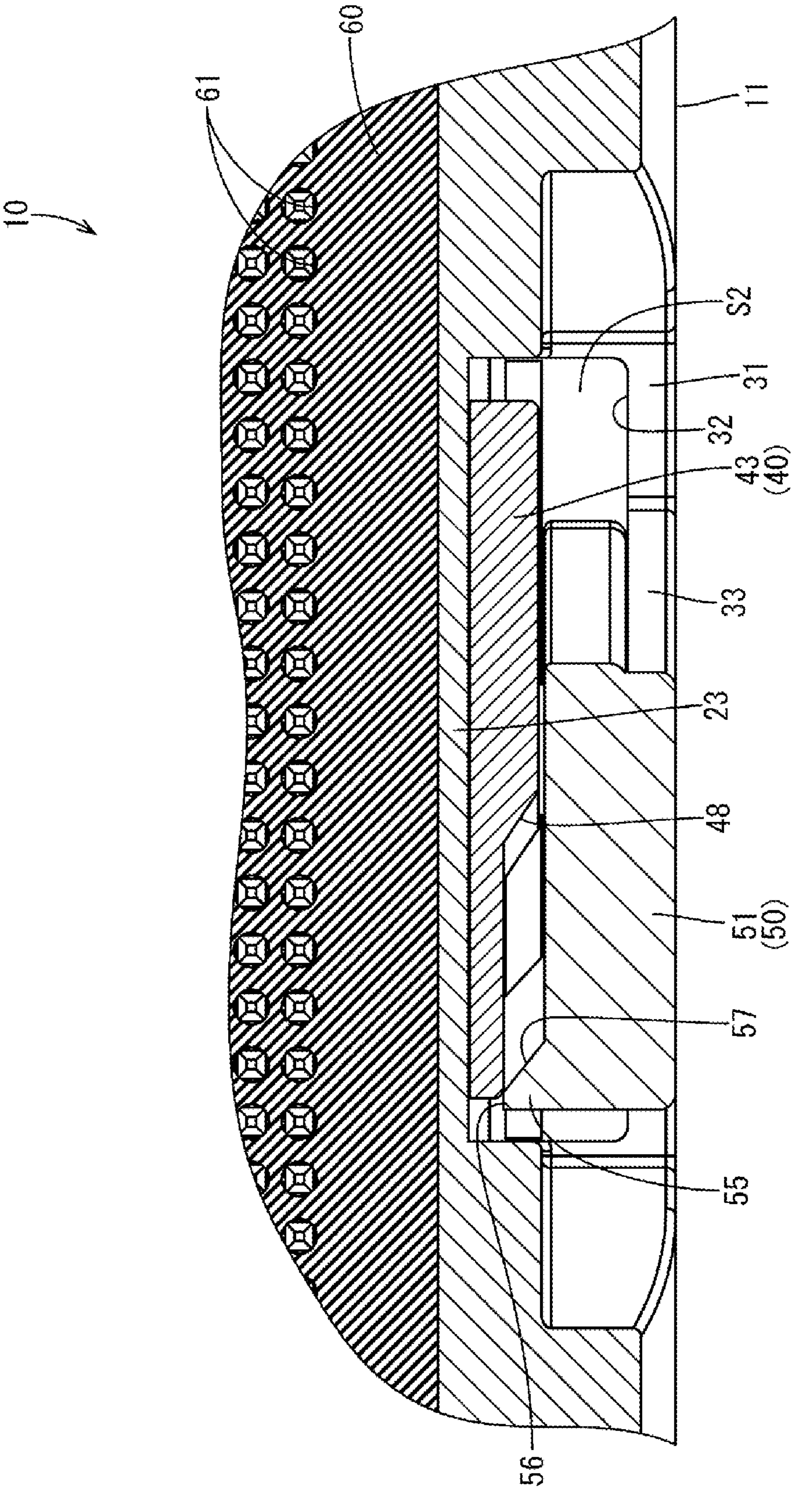
FIG. 5 is an enlarged cross-sectional view showing a principal part of FIG. 4.
Figure 8:
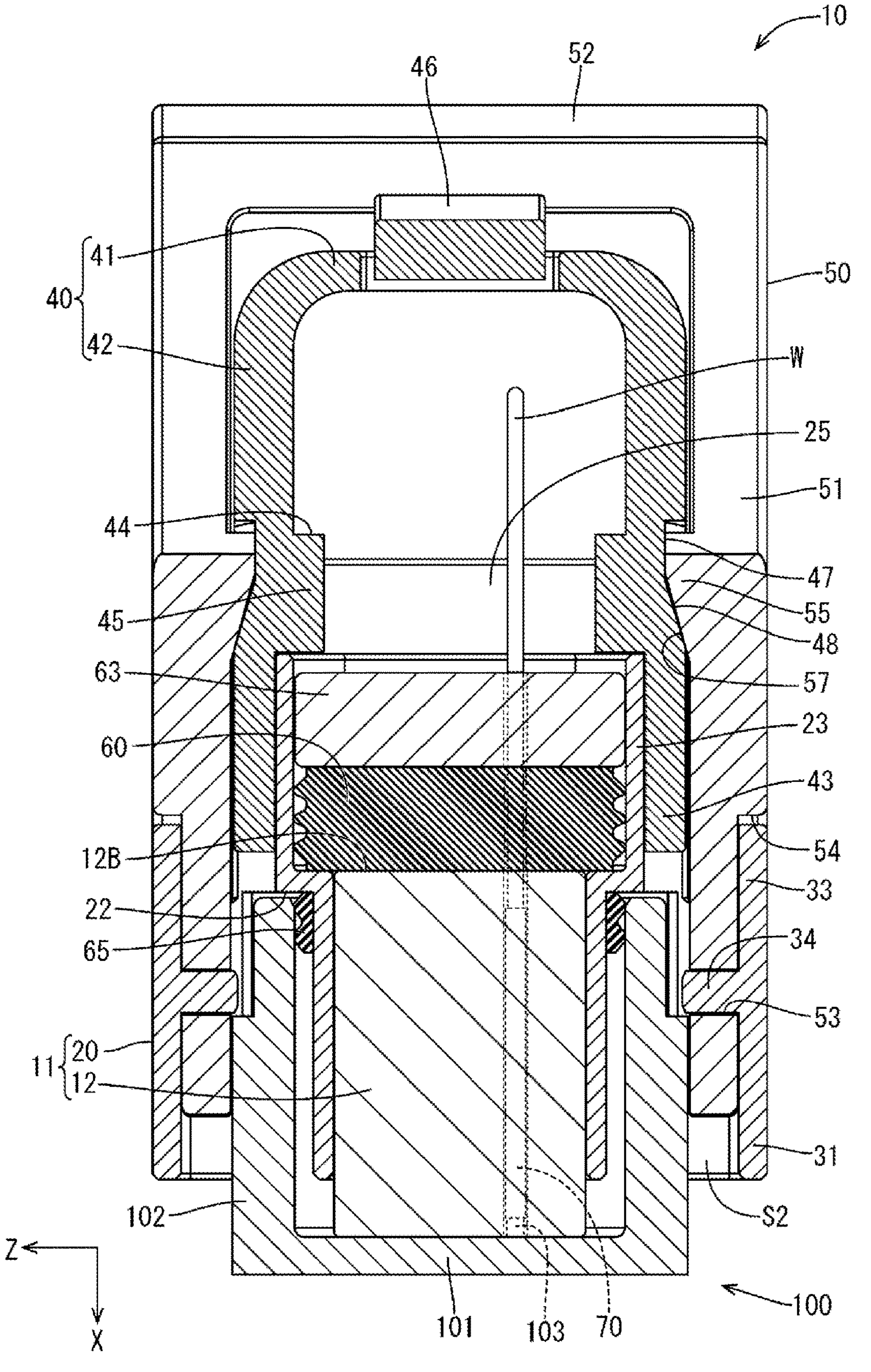
FIG. 8 is a cross-sectional view taken along the line C-C in FIG. 7.

The housing 11 is made of a synthetic resin, and as shown in FIGS. 3 and 8, includes an inner housing (an exemplary terminal housing part) 12 that holds the female terminal 70, and an outer housing 20 that holds the inner housing 12 thereinside.

As shown in FIGS. 3 and 8, the inner housing 12 has a substantially rectangular block shape, and has a plurality of cavities (not shown) extending therethrough in the front-rear direction. Each of the cavities is configured to house a female terminal 70 and an end portion of a wire W connected to the female terminal 70.

As shown in FIGS. 3 and 8, a sealing member 60 is attached to a back surface (an exemplary rear surface) 12B of the inner housing 12. The sealing member 60 has a plate shape, and is made of an elastic material such as rubber. The sealing member 60 includes, at its positions corresponding to openings of the plurality of cavities of the inner housing 12, a plurality of sealing member-side wire through holes 61 for passing a plurality of wires W therethrough (see FIG. 4, etc.). The sealing member 60 realizes waterproofing on the back surface 12B side of the inner housing 12.

Additionally, as shown in FIGS. 3 and 8, a rear holder 63 for holding the sealing member 60 in the inner housing 12 is provided on the back surface of the sealing member 60. The rear holder 63 is made of a synthetic resin, and has a plate shape. The rear holder 63 has, at its positions corresponding to the sealing member-side wire through holes 61, holder-side wire through holes (not shown) for passing the wires W therethrough. That is, the cavities of the inner housing 12, the sealing member-side wire through holes 61, and the holder-side wire through holes are in communication with one another in the front-rear direction.

Figure 10:
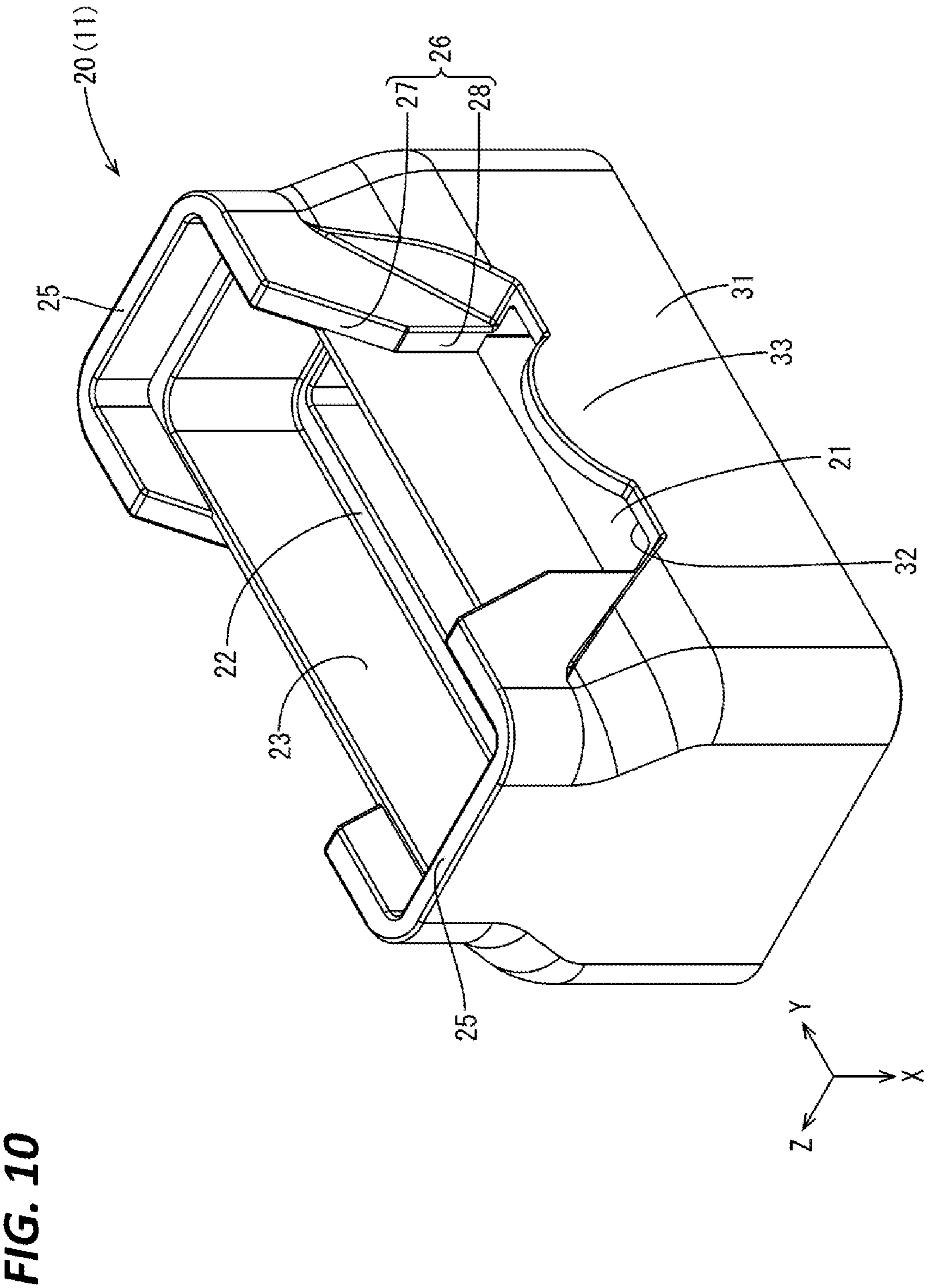
FIG. 10 is a perspective view of an outer housing according to an embodiment.
Figure 11:
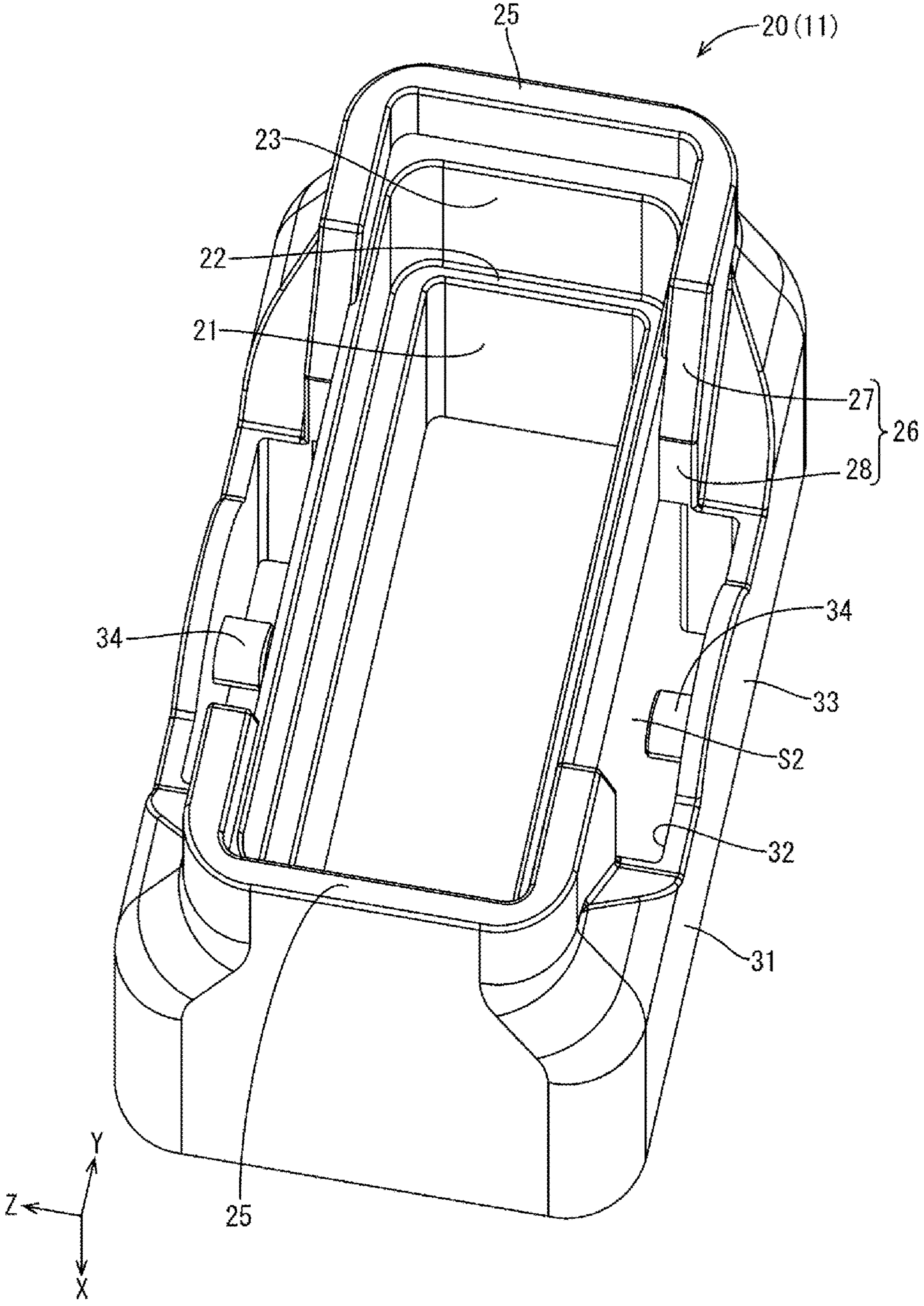
FIG. 11 is a perspective view of the outer housing according to the embodiment, as viewed from the rear side.
Figure 12:
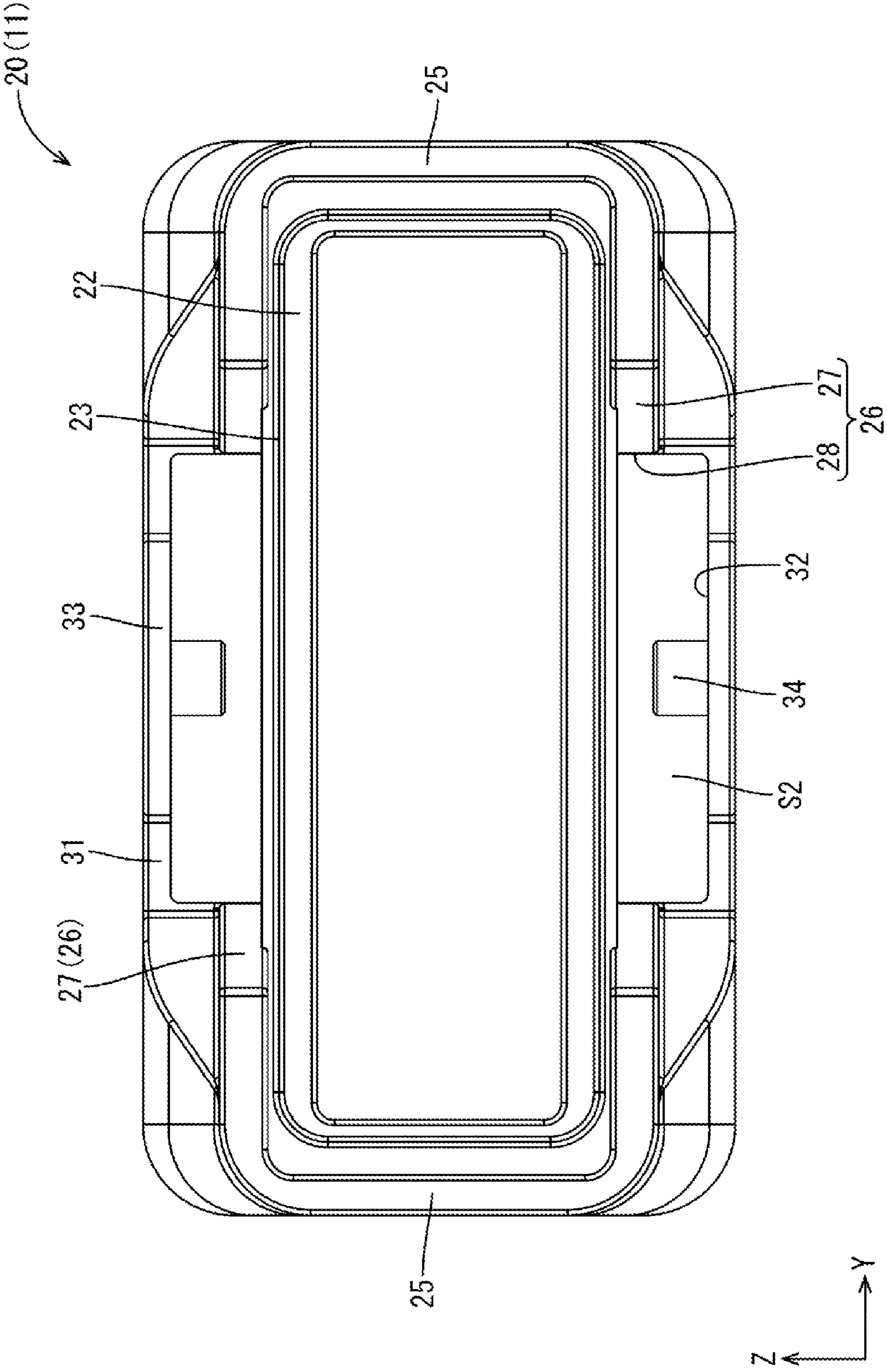
FIG. 12 is a rear view of the outer housing according to the embodiment.

On the other hand, the outer housing 20 has an overall substantially rectangular tubular shape, as shown in FIGS. 10 to 12. The outer housing 20 includes an inner holding wall 21, a holder holding wall 23, a cover holding wall 25, a lever holding wall 31, and two pivot shafts 34.

The inner holding wall 21 has a substantially rectangular tubular shape, and is configured to house the inner housing 12 thereinside. As shown in FIGS. 3 and 8, the length dimension of the inner holding wall 21 in the front-rear direction (X direction) is set to be slightly shorter than the length dimension of the inner housing 12 in the same direction (X direction). The inner housing 12 is held by the inner holding wall 21 such that the back surface 12B thereof is flush with a rear end of the inner holding wall 21, and that a front end thereof protrudes past a front end of the inner holding wall 21.

As also shown in FIGS. 3 and 8, the holder holding wall 23 has a substantially rectangular tubular shape whose size increases from the inner holding wall 21 via a housing-side stepped part 22 at the rear of the inner holding wall 21. Inside the holder holding wall 23, the sealing member 60 is housed in abutment against the back surface 12B of the inner housing 12, and the rear holder 63 is housed in abutment against the back surface of the sealing member 60. The holder holding wall 23 is set to a size such that the rear holder 63 does not protrude past the rear end thereof.

In addition, a ring-shaped second sealing member 65 made of an elastic material is attached to a corner portion of an outer surface of the housing-side stepped part 22 between the inner holding wall 21 and the holder holding wall 23.

As shown in FIG. 10 and so forth, the cover holding wall 25 overlaps an outer circumference of the holder holding wall 23 so as to surround the holder holding wall 23, and protrudes further rearward from the rear end of the holder holding wall 23. Of the cover holding wall 25, a pair of walls extending in the longitudinal direction (left-right direction, Y direction) are receiving parts 26 formed by cutting out a portion of the cover holding wall 25 from a central portion of the rear end toward the front side. Specifically, the receiving parts 26 each include an inclined portion 27 that is inclined forward from the rear end of the cover holding wall 25 so as to approach each other, and parallel portions 28 that extend parallel to each other continuously from the corresponding inclined portions 27 to a front end of the cover holding wall 25. The cover holding wall 25 is divided in two in the left-right direction by the receiving parts 26.

The lever holding wall 31 is provided so as to surround an outer circumference of the inner holding wall 21 via a space interposed therebetween. A rear end of the lever holding wall 31 is connected to the cover holding wall 25. Accordingly, a frame-shaped space surrounded by the lever holding wall 31 and the inner holding wall 21 is open forward, thus forming a fitting space S1 in which a hood part 102, which will be described later, of the male connector 100 can be received (see FIG. 3).

Two wall portions of the lever holding wall 31 that extend in the longitudinal direction (left-right direction, Y direction) have a thickness that is set to be larger than those of the other wall portions. Of each of the two wall portions of the lever holding wall 31 that extend in the longitudinal direction, a central portion corresponding to the portion at which the parallel portions 28 of the cover holding wall 25 are formed is formed as a recess 32 that is recessed outward from the inner surface (see FIGS. 11 and 12). The recess 32 has a groove shape that extends in the front-rear direction (X direction). In other words, the lever holding wall 31 bulges outward in a substantially gate shape from the inner holding wall 21 in the longitudinal direction thereof.

As shown in FIG. 10 and so forth, a semi-circular pivoting restriction part 33 extends rearward in regions of the lever holding wall 31 where the recesses 32 are formed in the left-right direction (Y direction). The pivoting restriction part 33 is a portion that restricts the pivoting range of the lever 50, which will be described later. The rear end of the pivoting restriction part 33 extends to a position at which the sealing member 60 is disposed in the front-rear direction of the housing 11 (see FIG. 3).

The space between an outer surface of the inner holding wall 21 and an inner surface of each of the recesses 32 of the lever holding wall 31 serves as a lever housing part S2 in which a leg part 51, which will be described later, of the lever 50 is housed (see FIG. 12).

Additionally, as shown in FIGS. 11 and 12, a pivot shaft 34 that protrudes toward the inner holding wall 21 is provided on the inner surface of each of the recesses 32 of the lever holding wall 31. The pivot shaft 34 is a columnar shaft for pivotably supporting the lever 50.

Wire Cover 40

Figure 13:
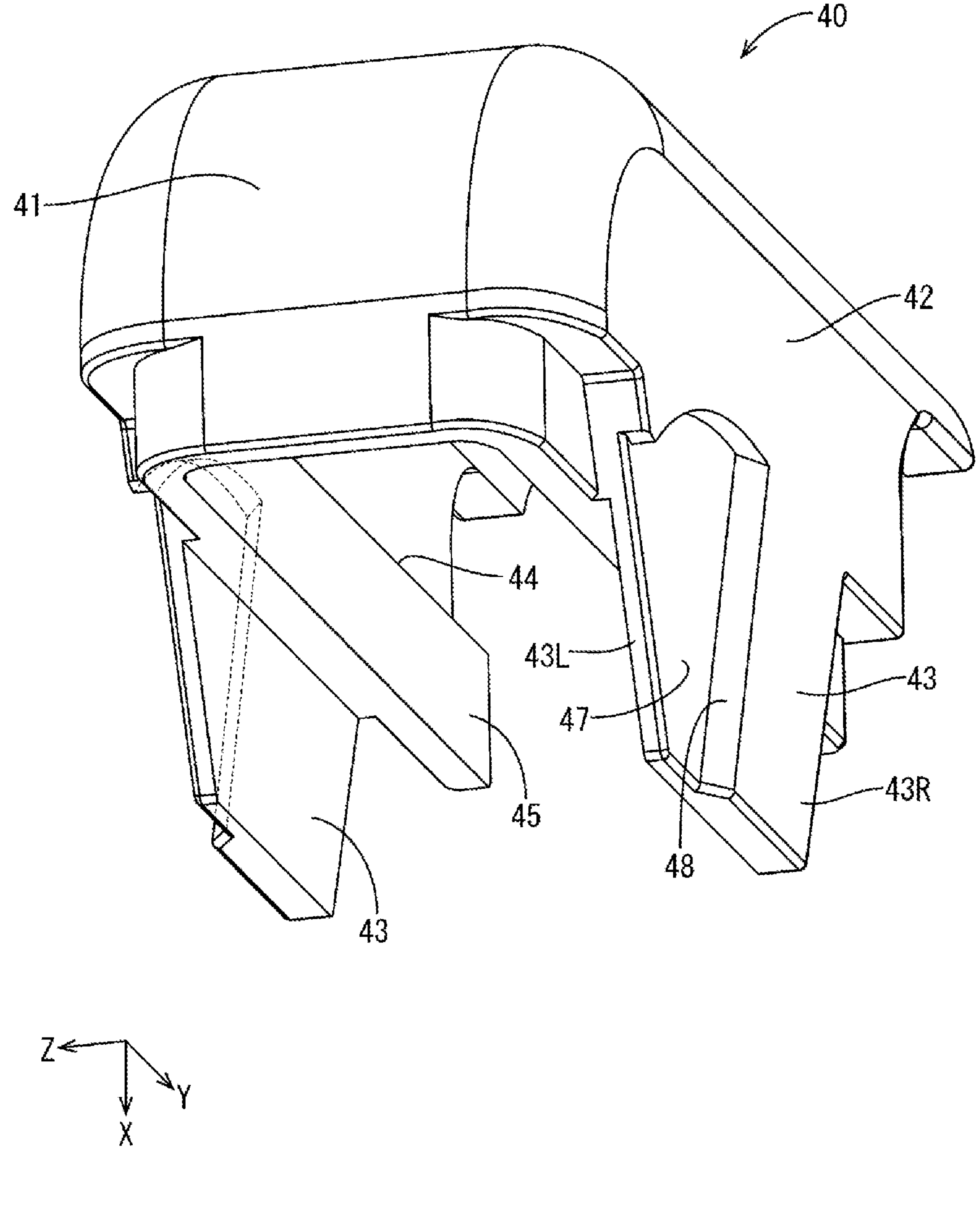
FIG. 13 is a perspective view of a wire cover according to an embodiment.
Figure 14:
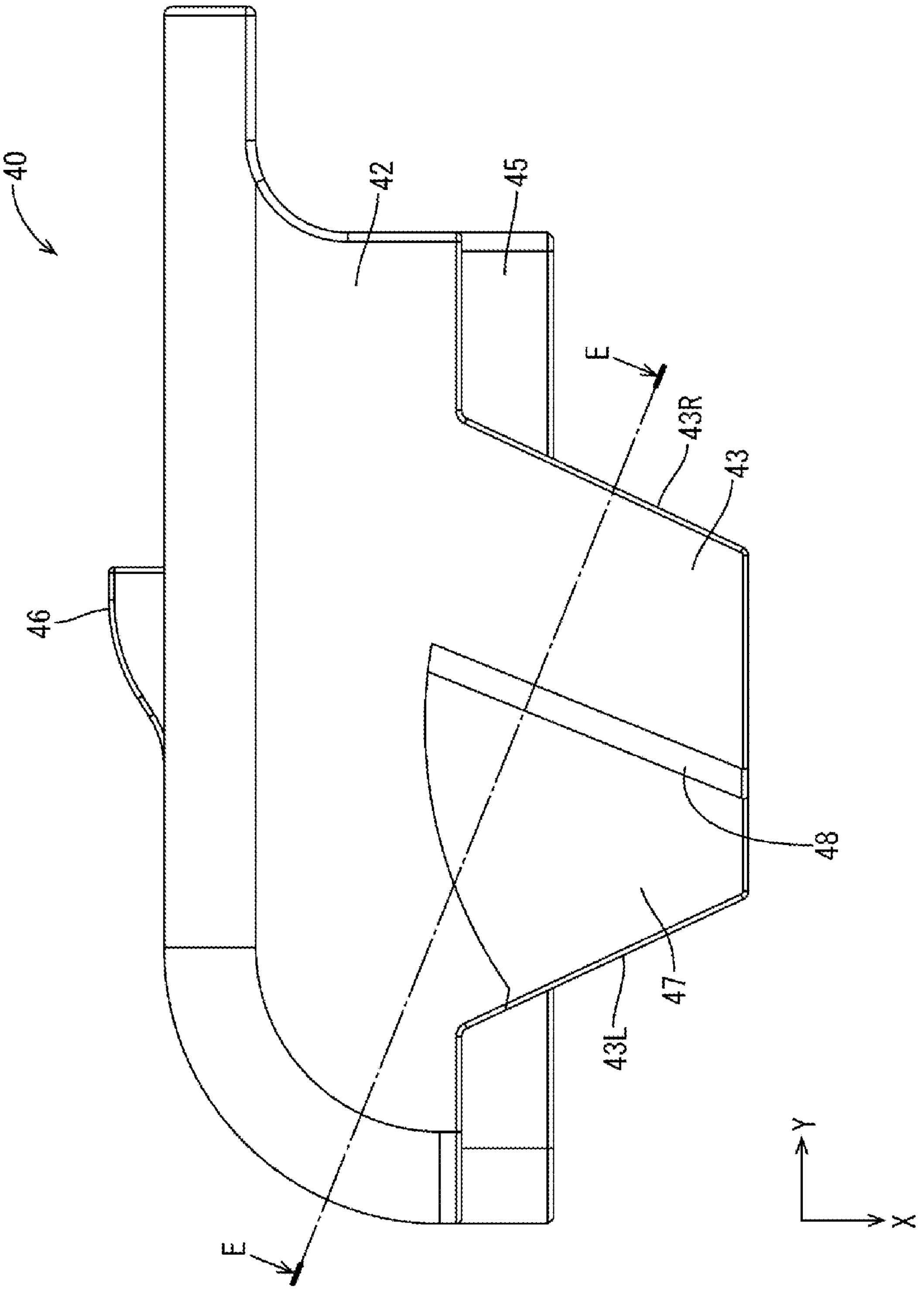
FIG. 14 is a side view of the wire cover according to the embodiment.

The wire cover 40 is a member that is mounted to the housing 11 so as to cover the back surface (the surface on the rear holder 63 side) in order to protect the wire W led out from the inner housing 12, and to lead the wire W in a predetermined direction. The wire cover 40 is made of a synthetic resin, and has a substantially box shape that is open at the front and on the right side, as shown in FIGS. 13 and 14. Hereinafter, a wall that extends in the left-right direction so as to cover the back surface of the housing 11 is referred to as a main wall 41, and two walls that extend forward from side edge portions of the main wall 41 and oppose each other are referred to as side walls 42. One end side (left side) of the main wall 41 is curved forward, and is continuous with left edge portions of the side walls 42.

An extending wall part (an exemplary outer covering part) 43 that extends forward extends from a central front end of each of the side walls 42 in the longitudinal direction (left-right direction, Y direction). As shown in FIG. 14, the extending wall part 43 has a tapered, substantially trapezoidal shape. In a state in which the wire cover 40 is mounted to the housing 11, left and right side edge portions of the extending wall part 43 are inclined at an angle at which the side edge portions are substantially tightly fitted to the corresponding receiving parts 26 (inclined portions 27) of the cover holding wall 25 (see FIGS. 2 and 7).

The inclination angles and positions of the side edges of the extending wall parts 43 and the receiving parts 26 (inclined portions 27) are set such that the extending wall parts 43 include the entire pivot trajectory, which will be described later, of the lever 50. More specifically, a left side edge portion 43L of each of the extending wall parts 43 according to the present embodiment is set at an inclination angle and a position at which the extending wall part 43 includes a left side edge portion 51L of the corresponding leg part 51 of the lever 50 at a fitting start position (see FIG. 2), and a right side edge portion 43R of the extending wall part 43 is set at an inclination angle and a position at which the extending wall part 43 includes a right side edge portion 51R of the leg part 51 of the lever 50 at a fitting completion position (see FIG. 7).

The extending wall parts 43 are disposed on the outer circumference of the holder holding wall 23 in a state in which the wire cover 40 is mounted to the housing 11. That is, the extending wall parts 43 are disposed at positions at which the extending wall parts 43 cover, from the outside, a portion of the housing 11 in which the sealing member 60 is housed (see FIGS. 3 and 7).

Fitting wall parts 45 extending inward and forward in a crank shape from the two side walls 42 via a cover-side stepped part 44 are provided at front end portions of the two side walls 42 of the wire cover 40, excluding extended proximal end portions of the extending wall parts 43 and the extending wall parts 43. The fitting wall parts 45 are portions that are fitted inside the cover holding wall 25 so as to hold the wire cover 40 with respect to the housing 11.

A cantilevered elastic locking piece (an exemplary lock part) 46 that protrudes rearward is provided on the main wall 41 of the wire cover 40. As shown in FIG. 1, the elastic locking piece 46 is formed by cutting and bending a portion of the main wall 41 from the left side toward the right side into a U-shape, and is configured to be elastically deformable in a direction intersecting the plate surface of the main wall 41. As a result of a right end portion of the elastic locking piece 46 abutting against, from the left side, an operation part 52 (an exemplary lock part) of the lever 50 at the fitting completion position (see FIG. 6), the lever 50 is restricted from pivoting from the fitting completion position toward the fitting start position.

Lever 50

Figure 6:
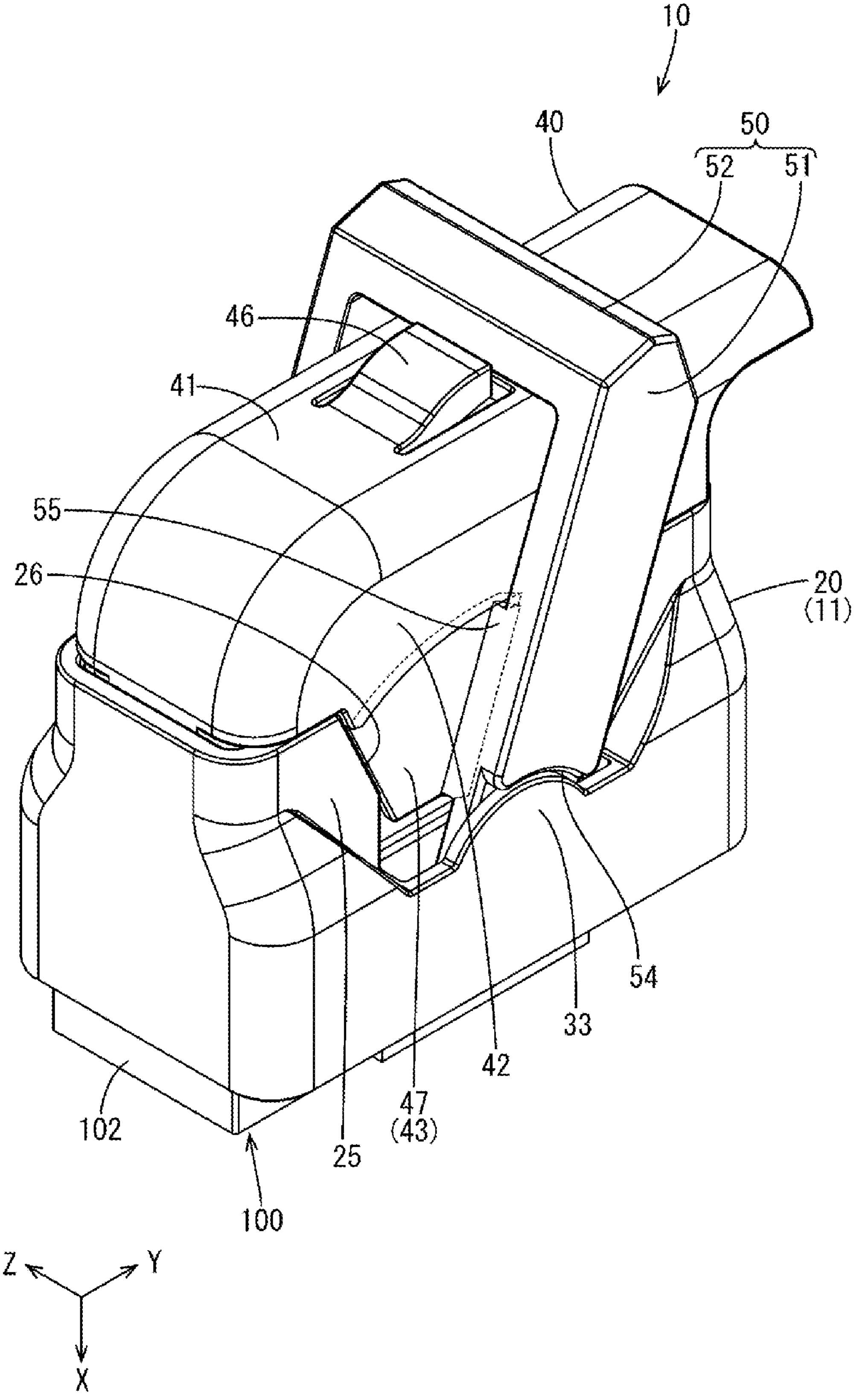
FIG. 6 is a perspective view showing a state in which the lever of the female connector according to the embodiment is disposed at a fitting completion position.

The lever 50 is a member for assisting fitting and separation between the female connector 10 and the male connector 100. The lever 50 is made of a synthetic resin, and is pivotably mounted to the housing 11 (outer housing 20), as shown in FIGS. 1, 6, and so forth.

Figure 16:
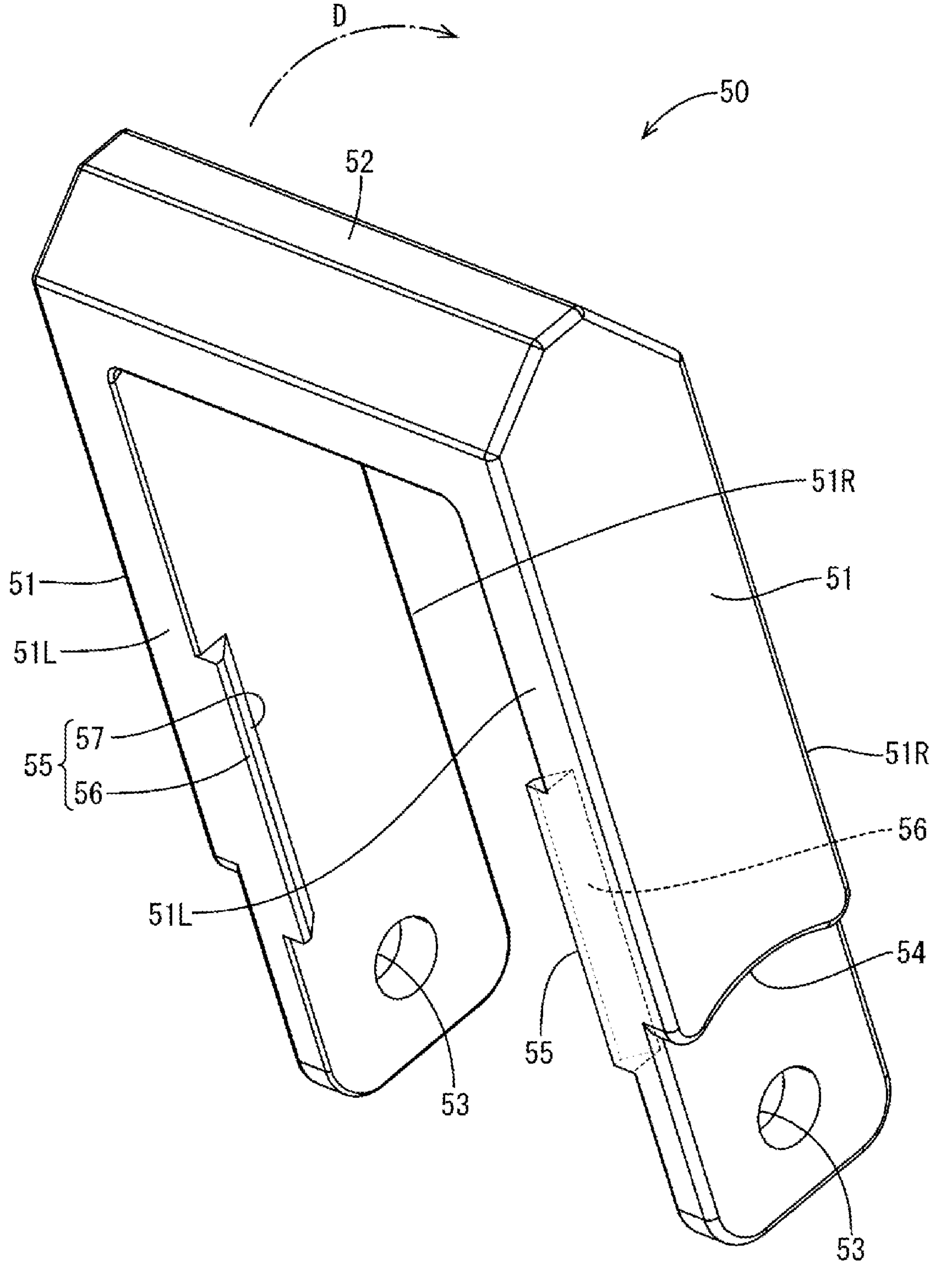
FIG. 16 is a perspective view of a lever according to an embodiment.
Figure 17:
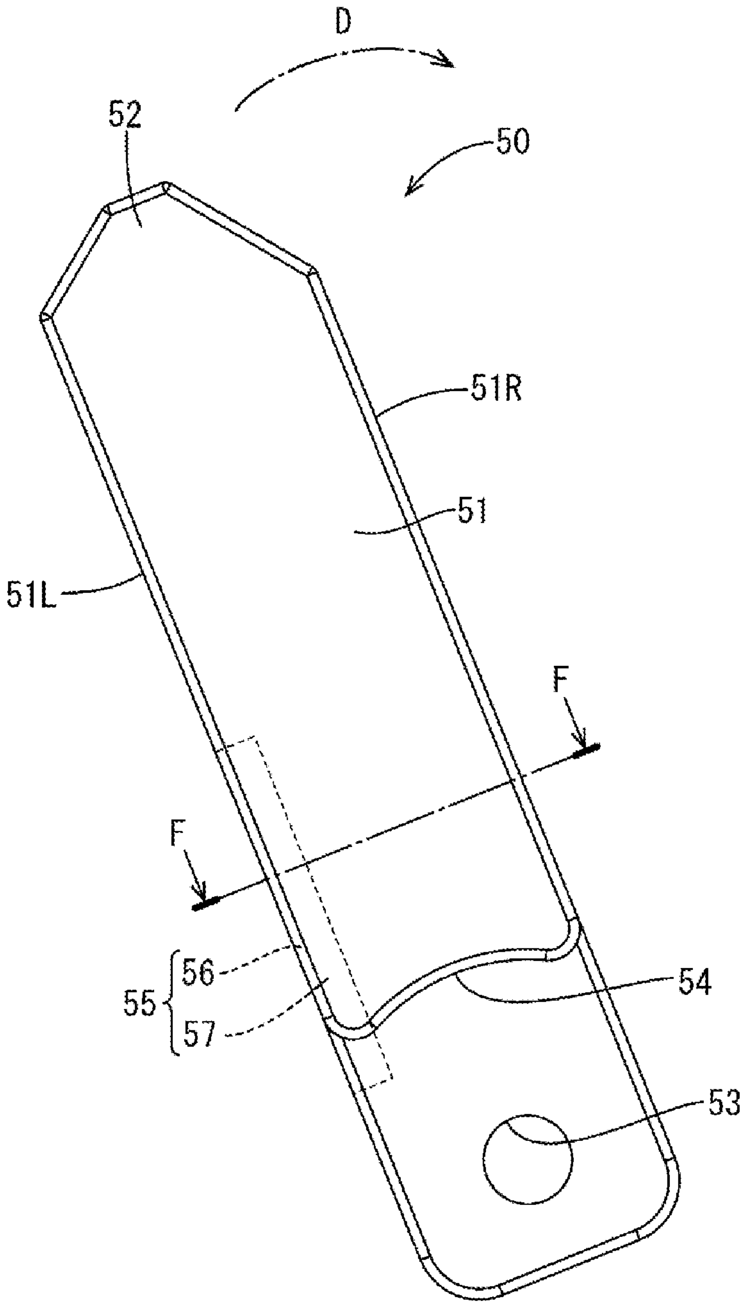
FIG. 17 is a side view of the lever of the embodiment.
Figure 18:
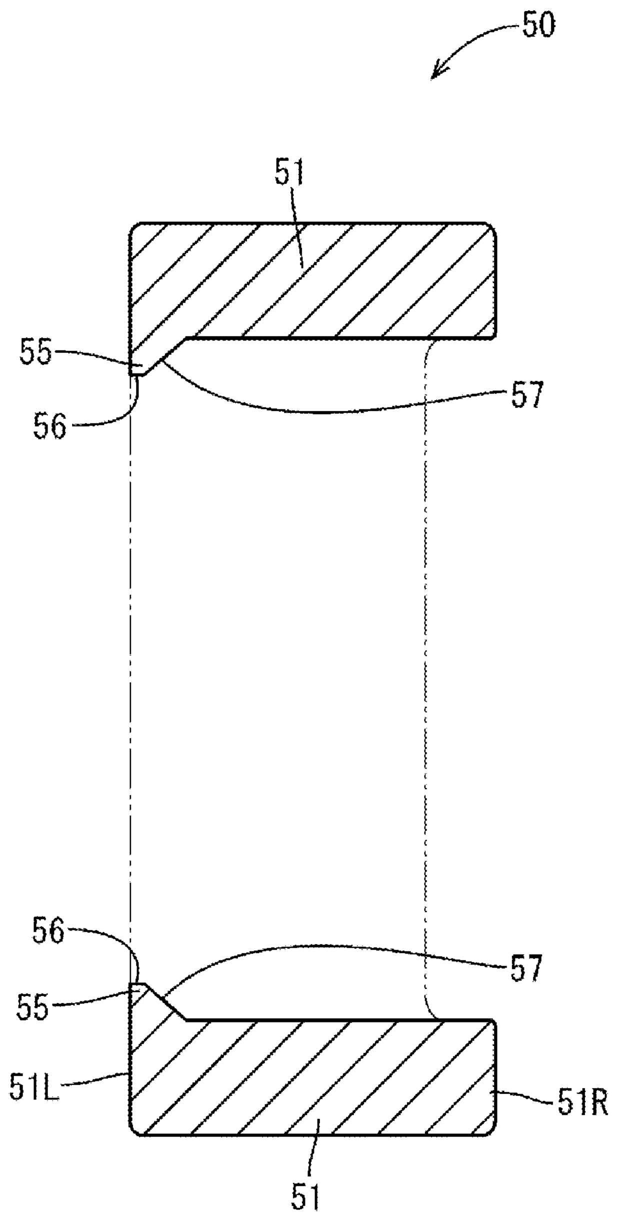
FIG. 18 is a cross-sectional view taken along the line F-F in FIG. 17.

As shown in FIGS. 16 to 18, the lever 50 includes two leg parts 51, and the operation part 52 that connects one end sides of the two leg parts 51 to each other.

Each of the two leg parts 51 has an elongated plate shape. A shaft hole 53, which is a circular hole, is provided on a distal end side (end portion on a side opposite to the operation part 52) of each of the two leg parts 51. The shaft holes 53 are holes into which the pivot shafts 34 of the housing 11 are inserted.

As shown in FIGS. 3 to 5, and FIGS. 8 and 9, the two leg parts 51 are housed in the corresponding two lever housing parts S2. A distal end side of an outer surface of each of the leg parts 51 is disposed along the lever holding wall 31. The inner surface of the leg part 51 is disposed along the inner holding wall 21 and the wire cover 40.

Figure 7:
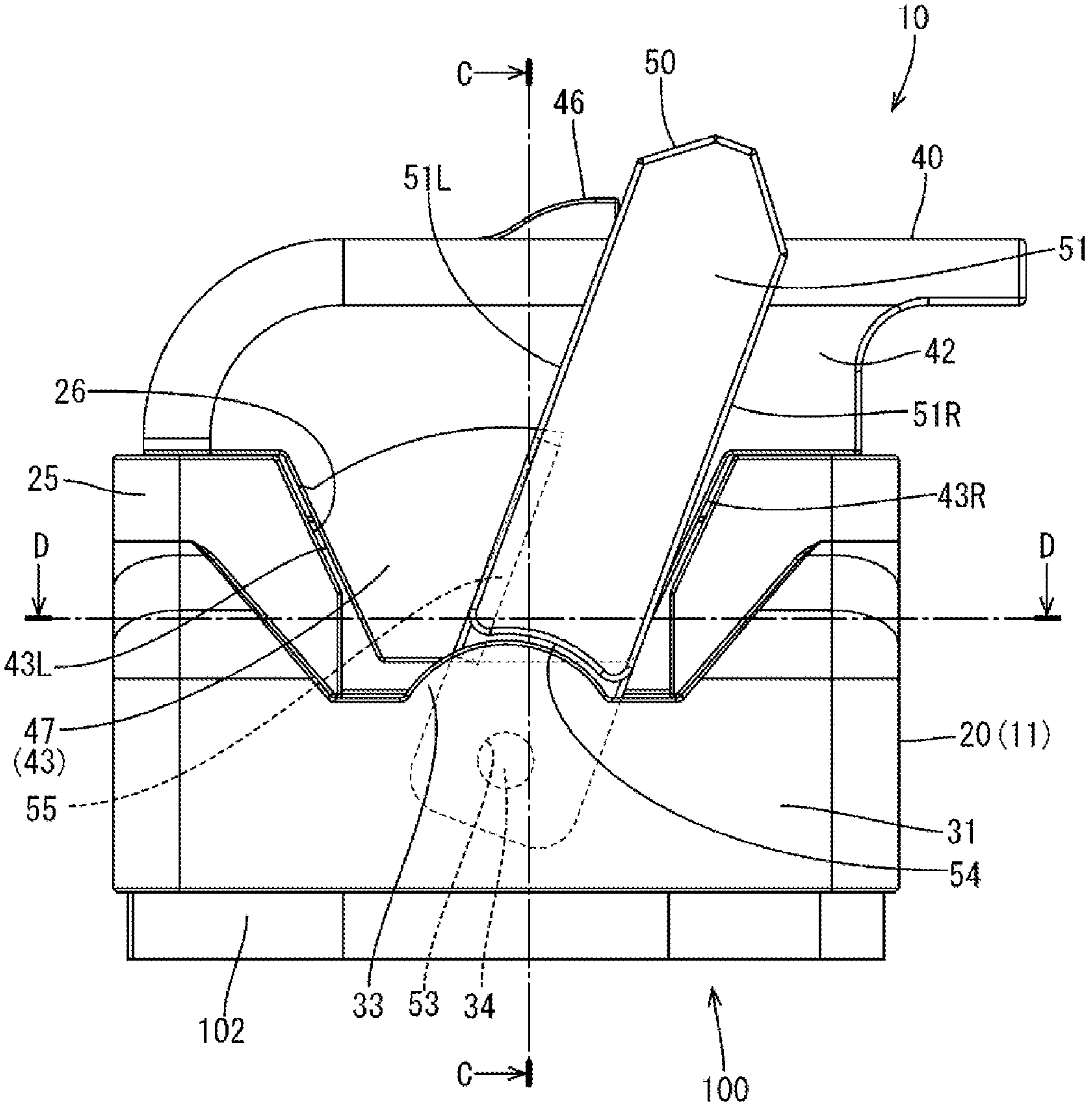
FIG. 7 is a side view showing a state in which the lever of the female connector according to the embodiment is disposed at the fitting completion position.

The lever 50 is pivotable, about the pivot shafts 34 serving as the pivot center, between the fitting start position (position shown in FIGS. 1 and 2) and the fitting completion position (position shown in FIGS. 6 and 7). When located at the fitting start position, the lever 50 is orientated so as to be inclined obliquely to the left relative to the left side housing 11. When located at the fitting completion position, the lever 50 is oriented so as to be inclined obliquely to the right relative to the housing 11.

The outer surface of each of the leg parts 5 is provided with a stepped restriction receiving part 54 that is disposed along an end face of the corresponding pivoting restriction part 33 of the lever holding wall 31 when the lever 50 is pivoted (see FIGS. 16 and 17). The restriction receiving part 54 is formed by arcuately cutting out, in the plate thickness direction, a portion of the outer surface that is located toward a distal end portion of the leg part 51. The lever 50 is allowed to pivot only within a range in which the restriction receiving parts 54 are disposed along the corresponding pivoting restriction parts 33.

Male Connector 100

As shown in FIG. 3, the male connector 100 (an exemplary counterpart connector) includes a bottom plate part 101, and a tubular hood part 102 that extends from the bottom plate part 101. Male terminals 103 that are to be connected to the female terminals 70 held in the inner housing 12 are held in the male connector 100.

Although not shown, gear receiving parts corresponding to gear parts (not shown) respectively included in the two leg parts 51 of the lever 50 are provided on an outer surface of the hood part 102. The fitting between the male connector 100 and the female connector 10 is achieved by a camming action between the gear parts and the gear receiving parts caused by a pivoting operation of the lever 50.

Pressing Ribs 55 and Pivot Allowing Parts 47

As shown in FIGS. 16 to 18, in the lever 50 according to the present embodiment, pressing ribs (exemplary protrusions) 55 are provided on the respective inner surfaces (surfaces opposed to each other) of the two leg parts 51. Each of the pressing ribs 55 is provided at a portion of the wire cover 40 where it overlaps the corresponding extending wall part 43 in a state in which the lever 50 is disposed at the fitting completion position (see FIG. 7). That is, the pressing rib 55 is provided on the distal end side relative to a central portion of the corresponding leg part 51 in the length direction.

Specifically, as shown in FIGS. 16 to 18, each of the pressing ribs 55 extends linearly along a left side edge portion 51L (end portion located on the fitting start position side) of the inner surface of the corresponding leg part 51 of the lever 50. In other words, the pressing rib 55 extends linearly, in a direction intersecting a pivot progression direction D in which the lever 50 pivots from the fitting start position toward the fitting completion position, at an opposite end portion of the inner surface of the leg part 51 of the lever 50 in the pivot progression direction D.

Of each of these pressing ribs 55, a corner portion located on the pivot progression direction D side of the lever 50 is formed as a rib-side inclined surface (an exemplary inclined pressing surface) 57 that is cut out obliquely. As shown in FIG. 18, each of the rib-side inclined surfaces 57 is inclined continuously to a plate surface (inner surface) of the corresponding leg part 51, from a top surface 56 of the pressing rib 55 in the pivot progression direction D.

Figure 2:
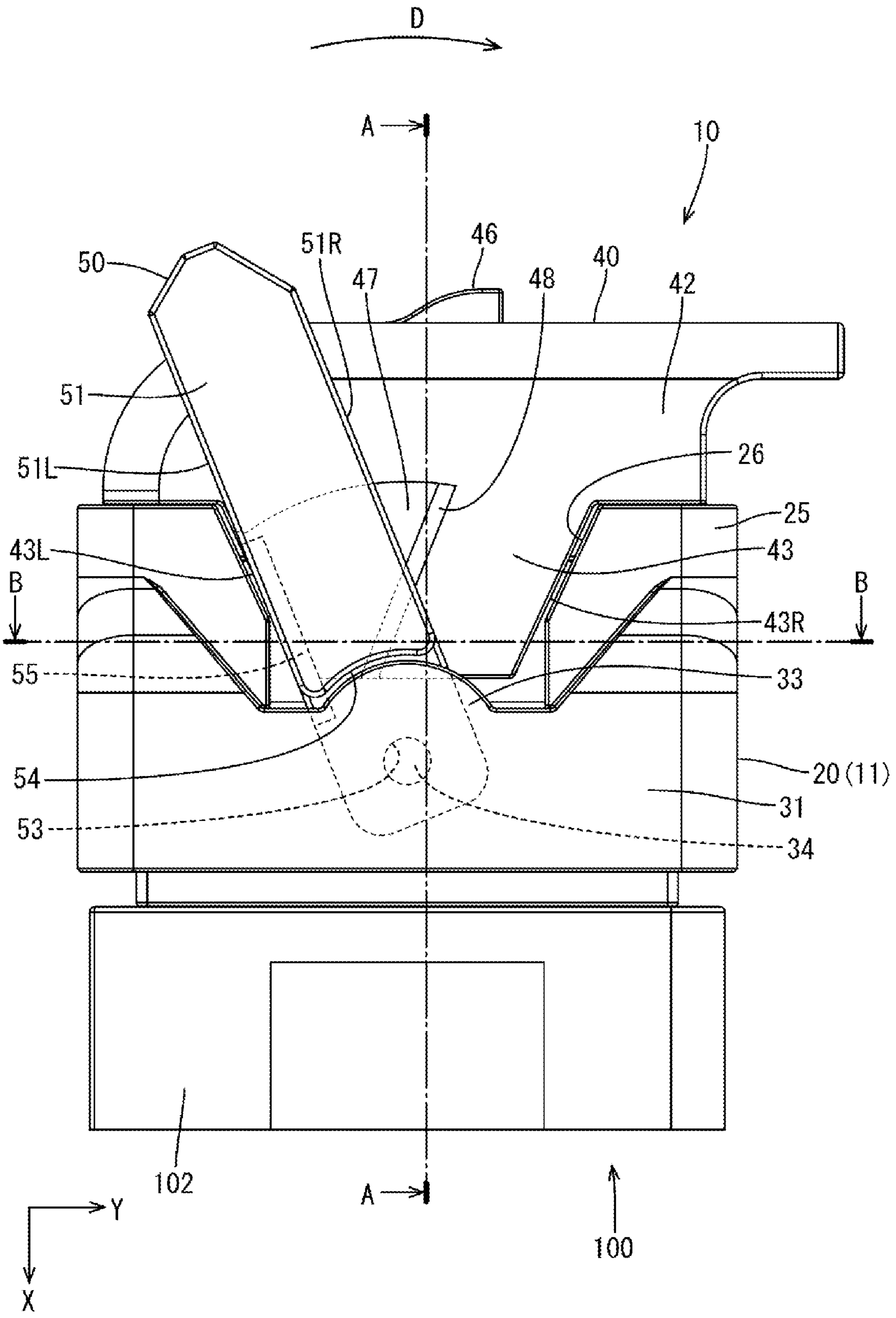
FIG. 2 is a side view showing a state in which the lever of the female connector according to the embodiment is disposed at the fitting start position.

Note that a front end (lower end in FIG. 17) of each of the pressing ribs 55 extends to a position that includes the front end of the corresponding extending wall part 43 in a state in which the lever 50 is mounted to the housing 11 (see FIGS. 2 and 7). That is, the front end extends to a position in close proximity to the pivot shaft 34. A rear end (upper end in FIG. 17) of the pressing rib 55 extends to a position that includes the outer circumference of the sealing member 60 in a state in which the lever 50 is mounted to the housing 11.

On the other hand, a pivot allowing part 47 is formed on each of the side walls 42 and the extending wall parts 43 of the wire cover 40 by partially cutting out the outer surface side of the side wall 42 and the extending wall part 43 to allow pivoting of the corresponding pressing rib 55, along a pivot trajectory along which the pressing rib 55 pivots as a result of pivoting of the lever 50. In the present embodiment, as shown in FIGS. 13 and 14, the pivot allowing part 47 has a fan shape that is cut out from the left side edge portion 43L of the extending wall part 43 toward the right side.

Figure 15:
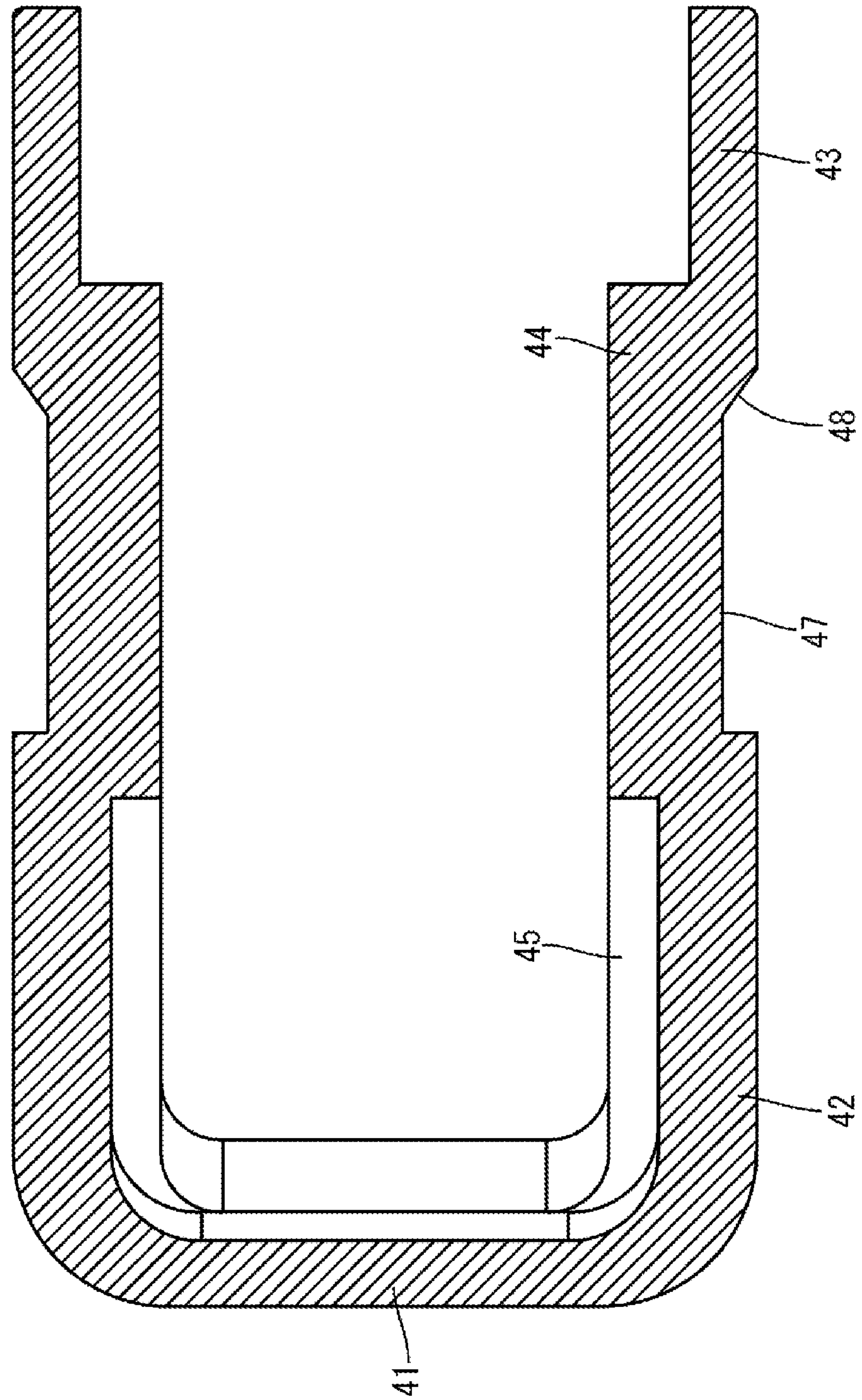
FIG. 15 is a cross-sectional view taken along the line E-E in FIG. 14.

In a state in which the lever 50 is disposed at the fitting completion position, a portion on which the rib-side inclined surface 57 of each of the pressing ribs 55 is disposed, or in other words, a cut-out edge portion of the right end of the corresponding pivot allowing part 47 is a cover-side inclined surface (an exemplary inclined pressed surface) 48 that is to overlap the rib-side inclined surface 57. That is, as shown in FIG. 15, the cover-side inclined surface 48 is inclined toward the opposite side of the lever 50 in the pivot progression direction D. The cover-side inclined surface 48 is disposed at a substantially central portion of the wire cover 40 in the longitudinal direction (left-right direction, Y direction) of the housing 11.

Fitting between Female Connector 10 and Male Connector 100

Next, an exemplary procedure for fitting the female connector 10 having the above-described configuration to the male connector 100 will be described below. First, as shown in FIGS. 1 and 2, in a state in which the lever 50 is held at the fitting start position, the housing 11 of the female connector 10 is loosely fitted to the male connector 100, and a distal end portion of the hood part 102 enters the fitting space S1. In a state in which the lever 50 is disposed at the fitting start position, the pressing ribs 55 of the lever 50 are disposed in the corresponding pivot allowing parts 47 of the wire cover 40, and thus the pressing ribs 55 and the wire cover 40 do not interfere with each other.

Next, the lever 50 is pivoted in the pivot progression direction D from the fitting start position toward the fitting completion position. During this pivoting, the pressing ribs 55 move along the pivot allowing parts 47, and therefore the pressing ribs 55 and the wire cover 40 do not interfere with each other. As a result of pivoting of the lever 50, the housing 11 is relatively drawn toward the male connector 100 by a camming action (not shown), whereby fitting proceeds.

After fitting between the female connector 10 and the male connector 100 has proceeded, and the lever 50 reaches the fitting completion position as shown in FIGS. 6 and 7, the housing 11 reaches a normal fitting position relative to the male connector 100. Immediately before the lever 50 reaches the fitting completion position, the operation part 52 of the lever 50 abuts against the elastic locking piece 46 of the wire cover 40 to gradually depress the elastic locking piece 46, and moves over the elastic locking piece 46 upon reaching the fitting position. Thus, the elastic locking piece 46 is elastically restored, and locks to a surface of the operation part 52 of the lever 50 that is located on the opposite side in the pivot progression direction D. Accordingly, the pivoting of the lever 50 to the opposite side in the pivot progression direction D is restricted, and the lever 50 is locked to the fitting position.

Figure 9:
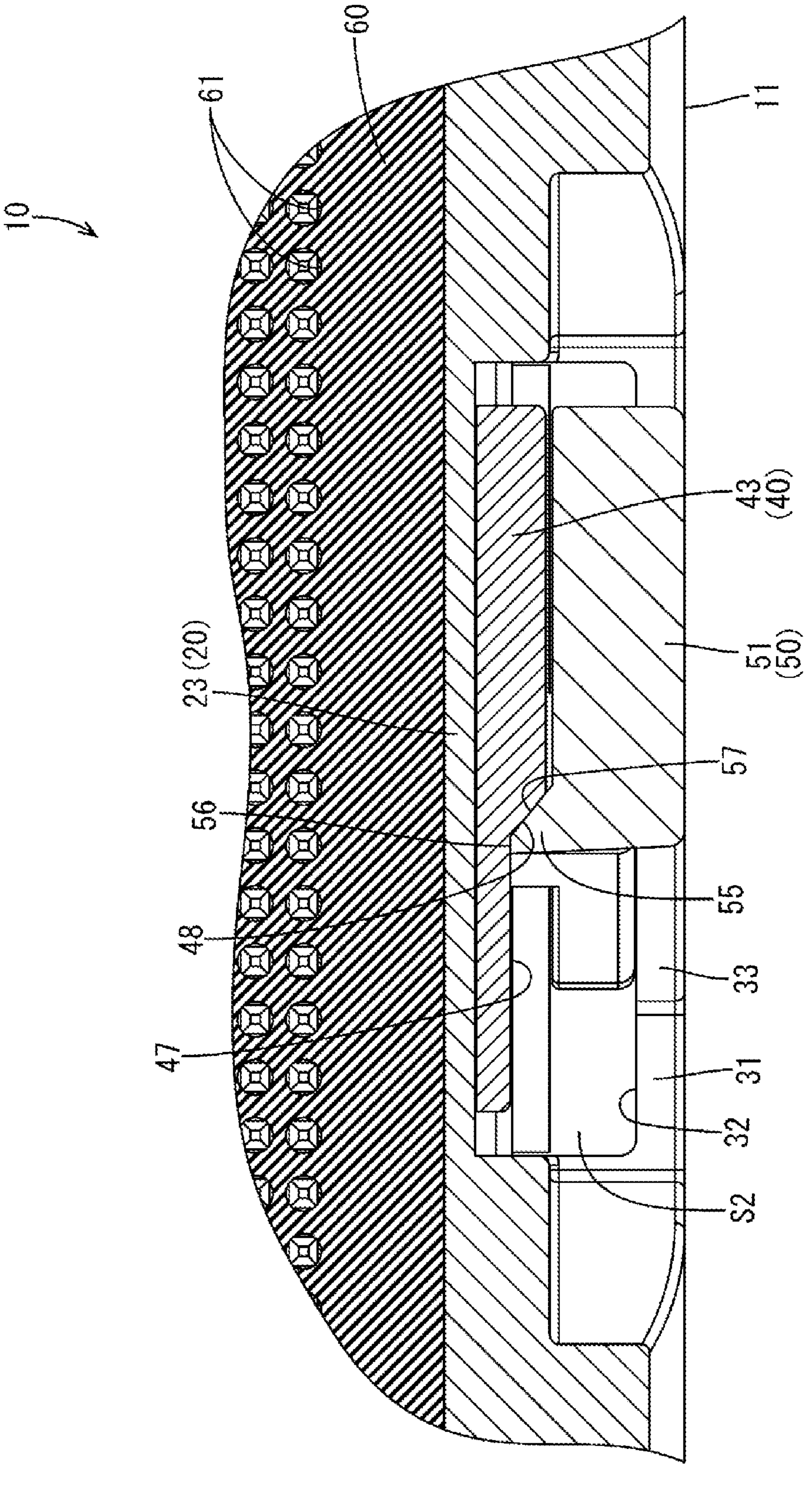
FIG. 9 is an enlarged cross-sectional views showing a principal part, taken along the line D-D in FIG. 7.

In this locked state, as shown in FIG. 9, the rib-side inclined surface 57 of each of the pressing ribs 55 provided on the leg parts 51 of the lever 50 overlaps with the corresponding cover-side inclined surface 48 of the wire cover 40 so as to move thereon, and presses the cover-side inclined surface 48 in a direction intersecting the cover-side inclined surface 48. At this time, the top surface 56 of the pressing rib 55 is in proximity to or abuts against the corresponding pivot allowing part 47. That is, at least through abutment between the inclined surfaces, the extending wall parts 43 of the wire cover 40 are pressed inward by the pressing ribs 55 of the lever 50. Accordingly, the holder holding wall 23 (outer housing 20) is pressed inward by the extending wall parts 43, and thus is less likely to bulge outward.

In this manner, the fitting between the female connector 10 and the male connector 100 is completed.

Operation and Effects

As described above, the female connector 10 according to the present embodiment includes: a housing 11 configured to be fittable to a male connector 100, and including an inner housing 12 that houses a terminal; a plate-shaped sealing member 60 configured to be abutted against a back surface 12B of the inner housing 12 inside the housing 11, and to allow a wire W connected to the terminal to pass therethrough; a wire cover 40 configured to be mounted to the housing 11, and to cover the wire W that is pulled out from the housing 11; and a lever 50 configured to be mounted to the housing 11, and to be pivotable from a fitting start position to a fitting completion position, wherein the wire cover 40 includes extending wall parts 43 that cover, from the outside, the housing 11 at a part of a portion thereof in which the sealing member 60 is housed, the lever 50 includes two leg parts 51, and an operation part 52 that connects the two leg parts 51, the leg parts 51 are configured to overlap outer sides of the corresponding extending wall parts 43 in a state in which the lever 50 is disposed at the fitting completion position, pressing ribs 55 protruding toward the corresponding extending wall parts 43 are provided on inner surfaces of the corresponding leg parts 51 at portions that overlap the corresponding extending wall parts 43 in a state in which the lever 50 is disposed at the fitting completion position, the pressings rib 55 each have a rib-side inclined surface 57 that is inclined toward a pivot progression direction D in which the lever 50 pivots from the fitting start position toward the fitting completion position, and rib-side inclined surfaces 57 that are inclined toward an opposite side in the pivot progression direction D, and against which the corresponding cover-side inclined surfaces 48 are abutted are provided on outer surfaces of the corresponding extending wall parts 43 at portions where the rib-side inclined surfaces 57 are disposed in a state in which the lever 50 is disposed at the fitting completion position.

With such a configuration, even if the sealing member 60 through which the wire W is passed bulges outward in the radial direction in a state in which the lever 50 is disposed at the fitting completion position, and a force is exerted in a direction (outward) to cause the housing 11 (outer housing 20) to bulge, the housing 11 is pressed inward by the extending wall parts 43 of the wire cover 40 and the leg parts 51 of the lever 50 that overlap the outer surface of the housing 11. Thus, bulging of the housing 11 is suppressed.

Moreover, the pressing ribs 55 provided on the leg parts 51 of the lever 50 reliably press the holder holding wall 23 (outer housing 20) via the extending wall parts 43 with a partially strong force. Accordingly, it is possible to more reliably suppress deformation (bulging) of the housing 11 as compared with a configuration in which the lever 50 includes no pressing ribs 55.

In addition, the rib-side inclined surfaces 57 provided on the pressing ribs 55 of the lever 50 are abutted against the corresponding cover-side inclined surfaces 48 provided on the wire cover 40 upon completion of fitting. Accordingly, the provision of the pressing ribs 55 does not significantly increase the fitting force required during pivoting as compared with a configuration in which no pressing ribs 55 are provided. On the other hand, in a state in which the lever 50 is disposed at the fitting completion position, the rib-side inclined surfaces 57 and the cover-side inclined surfaces 48 have already been abutted against each other. Accordingly, even if a force is exerted on the housing 11 in a bulging direction, deformation of the holder holding wall 23 (outer housing 20) is suppressed, and the housing 11 (outer housing 20) is pressed inward with a partially strong force.

Moreover, the rib-side inclined surfaces 57 and the corresponding cover-side inclined surfaces 48 can overlap each other by moving over each other until a clearance formed between the lever 50 and the wire cover 40 is filled. Accordingly, it is possible to more reliably suppress deformation of the outer housing 20.

A pivot allowing part 47 for allowing pivoting of each of the pressing ribs 55 is formed on the corresponding extending wall part 43 by cutting out a portion of an outer surface of the extending wall part 43, along a pivot trajectory along which the pressing rib 55 pivots when the lever 50 pivots between the fitting start position and the fitting completion position, and each of the cover-side inclined surfaces 48 is constituted by a cut-out edge portion formed by cutting out a portion of the corresponding pivot allowing part 47.

With the aforementioned configuration, it is possible to realize an embodiment of a configuration in which the lever 50 does not interfere with the wire cover 40 when being pivoted from the fitting start position to the fitting completion position, and the rib-side inclined surfaces 57 of the pressing ribs 55 abut against the corresponding cover-side inclined surfaces 48 of the wire cover 40 at the time when the lever 50 is disposed at the fitting completion position. Accordingly, the lever 50 does not come into slidable contact with the wire cover 40 while pivoting, and it is possible to prevent a frictional force generated by the lever 50 and the wire cover 40 from being added to the fitting force.

The cover-side inclined surfaces 48 are provided at a central portion of the wire cover 40 in the length direction of the housing 11. With such a configuration, the central portion in the length direction of the housing 11, which is likely to undergo significant deformation as compared with other portions, can be pressed inward, and it is therefore possible to more effectively suppress deformation of the housing 11.

An elastic locking piece 46 that restricts pivoting of the lever 50 toward the fitting start position by locking to the lever 50 in a state in which the lever 50 is disposed at the fitting completion position is provided on the wire cover 40.

With the aforementioned configuration, it is possible to avoid a situation where bulging of the housing 11 causes the lever 50 to be pressed back toward the fitting start position, thus enabling the housing 11 (outer housing 20) to be continuously pressed inward in a reliable manner.

In this manner, with the female connector 10 according to the present embodiment, it is possible to suppress bulging of the housing 11 (outer housing 20) caused by the sealing member 60, and suppress a reduction in waterproofness due to plastic deformation.

Other Embodiments (1) The above embodiment has described a configuration in which each of the pressing ribs 55 is provided at an end portion on the opposite side in the pivot progression direction D of the corresponding leg part 51 of the lever 50. However, the portion at which the pressing rib is provided is not limited to an end portion on the opposite side in the pivot progression direction, and it is also possible to adopt a configuration in which the pressing rib is provided at another portion.

(2) Although the above embodiment has described a configuration in which each of the protrusions is in the form of a rib, the protrusion is not limited to a rib, and may have another configuration. For example, it is also possible to arrange many short protrusions side-by-side.

(3) The above embodiment has described a configuration in which the cover-side inclined surfaces 48 are provided at a substantially central portion of the housing 11 in the length direction. However, it is also possible to adopt a configuration in which the inclined pressed surfaces are provided at a position toward an end of the housing in the length direction.

(4) Although the above embodiment has described a configuration in which the inner housing 12 and the outer housing 20 are formed by separate members, the inner housing and the outer housing may be formed by one member.

(5) The configuration of the lock part is not limited to the above embodiment.

(6) The inclined pressed surface is not limited to a configuration constituted by a cut-out edge portion of the pivot allowing part, and can also be formed, for example, by cutting out a corner portion of a protrusion similar to the pressing rib that protrudes from an external covering part disposed so as to be spaced apart from the inner surface of the lever.

(7) The above embodiment has described a configuration in which the pressing ribs 55 each have a trapezoidal cross-sectional shape that includes a flat top surface 56 and a rib-side inclined surface 57, as shown in FIG. 18. However, it is also possible to adopt a configuration in which the pressing ribs each have a triangular cross-sectional shape that does not include a flat top surface.

LIST OF REFERENCE NUMERALS

10 Female connector
11 Housing (connector housing)
12 Inner housing (terminal housing part)
12B Back surface (rear surface)
20 Outer housing (connector housing)
21 Inner holding wall
22 Housing-side stepped part
23 Holder holding wall
25 Cover holding wall
26 Receiving part
27 Inclined portion
28 Parallel portion
31 Lever holding wall
32 Recess
33 Pivoting restriction part
34 Pivot shaft
40 Wire cover
41 Main wall
42 Side wall
43 Extending wall part (outer covering part)
43L Left side edge portion
43R Right side edge portion
44 Cover-side stepped part
45 Fitting wall part
46 Elastic locking piece (lock part)
47 Pivot allowing part
48 Cover-side inclined surface (inclined pressed surface)
50 Lever
51 Leg part
51L Left side edge portion
51R Right side edge portion
52 Operation part (lock part)
53 Shaft hole
54 Restriction receiving part
55 Pressing rib (protrusion)
56 Top surface
57 Rib-side inclined surface (inclined pressing surface)
60 Sealing member
61 Sealing member-side wire through hole
63 Rear holder
65 Second sealing member
70 Female terminal (terminal)
85A Guide receiving part
100 Male connector
101 Bottom plate part
102 Hood part
103 Male terminal
D Pivot progression direction
S1 Fitting space
S2 Lever housing part
W Wire

What is claimed is:

1. A lever-type connector comprising:

a connector housing configured to be fittable to a counterpart connector, and including a terminal housing part that houses a terminal;

a plate-shaped sealing member configured to be abutted against a rear surface of the terminal housing part inside the connector housing, and to allow a wire connected to the terminal to pass therethrough;

a wire cover configured to be mounted to the connector housing, and to cover the wire that is pulled out from the connector housing; and a lever configured to be mounted to the connector housing, and to be pivotable from a fitting start position to a fitting completion position, wherein the wire cover includes outer covering parts that cover, from the outside, the connector housing at least at a part of a portion of the connector housing in which the sealing member is housed, the lever includes two leg parts, and an operation part that connects the two leg parts, and the leg parts are configured to overlap outer sides of the corresponding outer covering parts in a state in which at least the lever is disposed at the fitting completion position, protrusions protruding toward the corresponding outer covering parts are provided on inner surfaces of the corresponding leg parts at portions that overlap the corresponding outer covering parts in a state in which the lever is disposed at the fitting completion position, and the protrusions each include an inclined pressing surface that is inclined in a pivot progression direction in which the lever pivots from the fitting start position toward the fitting completion position, and inclined pressed surfaces that are inclined toward an opposite side in the pivot progression direction, and against which the corresponding inclined pressing surfaces are abutted are provided on outer surfaces of the corresponding outer covering parts at portions where the inclined pressing surfaces are disposed in a state in which the lever is disposed at the fitting completion position.

2. The lever-type connector according to claim 1, wherein a pivot allowing part for allowing pivoting of each of the protrusions is formed on the corresponding outer covering part by cutting out a portion of an outer surface side of the outer covering part, along a pivot trajectory along which the protrusion pivots when the lever pivots between the fitting start position and the fitting completion position, and each of the inclined pressed surfaces is constituted by a cut-out edge portion formed by cutting out a portion of the corresponding pivot allowing part.

3. The lever-type connector according to claim 1, wherein the inclined pressed surfaces are provided at a central portion of the wire cover in a length direction of the connector housing.

4. The lever-type connector according to claim 1, further comprising a lock part that restricts pivoting of the lever toward the fitting start position in a state in which the lever is disposed at the fitting completion position.

* * * * *